(12) United States Patent
Reuter

(10) Patent No.: US 9,431,013 B2
(45) Date of Patent: Aug. 30, 2016

(54) CO-TALKER NULLING FOR AUTOMATIC SPEECH RECOGNITION SYSTEMS

(71) Applicant: Continental Automotive Systems, Inc., Auburn Hills, MI (US)

(72) Inventor: Mike Reuter, Park Ridge, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 313 days.

(21) Appl. No.: 14/074,609

(22) Filed: Nov. 7, 2013

(65) Prior Publication Data

US 2015/0127338 A1    May 7, 2015

(51) Int. Cl.
| | | |
|---|---|---|
| G10L 15/00 | (2013.01) | |
| H04R 3/00 | (2006.01) | |
| G10L 15/20 | (2006.01) | |
| G10L 21/0316 | (2013.01) | |
| H04R 1/08 | (2006.01) | |
| G10L 21/00 | (2013.01) | |
| H04N 7/18 | (2006.01) | |
| H04B 3/20 | (2006.01) | |
| H04R 1/40 | (2006.01) | |
| G10L 21/0216 | (2013.01) | |

(52) U.S. Cl.
CPC ........... *G10L 15/20* (2013.01); *G10L 21/0316* (2013.01); *H04R 1/08* (2013.01); *H04R 3/005* (2013.01); G10L 2021/02165 (2013.01); H04R 1/406 (2013.01); H04R 2430/20 (2013.01); H04R 2499/13 (2013.01)

(58) Field of Classification Search
USPC ............ 704/233, 226, 251, 275; 381/92, 66; 348/148
See application file for complete search history.

(56) References Cited

U.S. PATENT DOCUMENTS

| | | | |
|---|---|---|---|
| 2006/0253282 A1* | 11/2006 | Schmidt ............... | G07C 5/0808 704/233 |
| 2007/0003074 A1* | 1/2007 | Ruwisch ................. | G10L 21/02 381/92 |
| 2008/0107280 A1* | 5/2008 | Haulick ................ | H04M 9/082 381/66 |
| 2009/0055170 A1* | 2/2009 | Nagahama ............. | G10L 15/20 704/226 |
| 2009/0055180 A1* | 2/2009 | Coon ................... | B60R 16/0373 704/251 |
| 2009/0116661 A1 | 5/2009 | Hetherington | |
| 2010/0124339 A1 | 5/2010 | Turnbull et al. | |
| 2011/0090338 A1* | 4/2011 | DeLine ................... | B60R 1/12 348/148 |

(Continued)

FOREIGN PATENT DOCUMENTS

EP    0472356 A1    2/1992

OTHER PUBLICATIONS

Aarabi et al, "Phase-Based Dual-Microphone Robust Speech Enhancement", IEEE Transactions on Systems, Man, and Cybernetics—Part B: Cybernetics, vol. 34, No. 4, Aug. 2004.
Search Report dated Jul. 10, 2014, from corresponding GB Patent Application No. GB1322979.4.

*Primary Examiner* — Pierre-Louis Desir
*Assistant Examiner* — Neeraj Sharma

(57) ABSTRACT

Speech from a driver and speech from a passenger in a vehicle is selected directionally using two or more microphones. Samples of speech from a driver and picked up by a first microphone are delayed until samples of the speech picked up by a second microphone is in phase with the speech picked up by the first microphone. Samples of a passenger's speech and picked up by the second microphone are delayed until samples of the passenger's speech picked up by the first microphone are out-of-phase with the speech picked up by the second microphone.

6 Claims, 8 Drawing Sheets

(56) References Cited

U.S. PATENT DOCUMENTS

| | | | |
|---|---|---|---|
| 2012/0185247 A1* | 7/2012 | Tzirkel-Hancock | G10L 21/0208 704/233 |
| 2015/0120305 A1* | 4/2015 | Buck | H04R 3/005 704/275 |

* cited by examiner

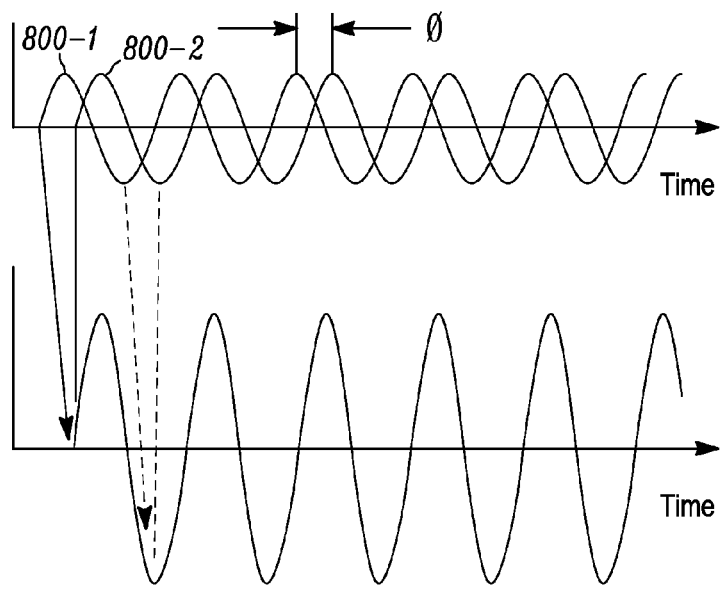
FIG. 8
FIG. 9
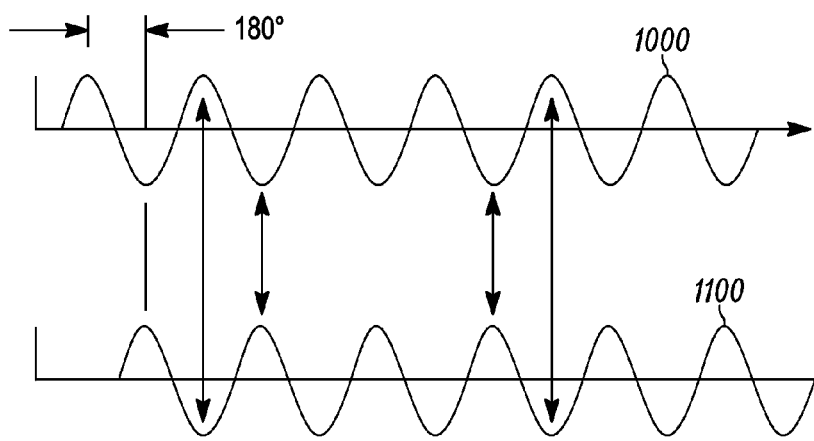
FIG. 10
FIG. 11

CO-TALKER NULLING FOR AUTOMATIC SPEECH RECOGNITION SYSTEMS

CROSS-REFERENCE TO RELATED APPLICATIONS

This application is related to the following application Ser. No. 14/074,645: Co-Talker Nulling Based on Multi Super Directional Beamformer, invented by Jianming Song and Mike Reuter, filed on the same day as this application.

BACKGROUND

The accurate recognition of human speech by a computer has improved over the last several years but is not yet one-hundred percent accurate. One known problem with speech recognition systems is the exclusion of sounds or speech that emanate from someone other than a person whose speech is intended to be recognized, i.e., co-talker speech can confuse speech recognition systems. Being able to locate and suppress sounds from a co-talker would be an improvement over the prior art.

BRIEF DESCRIPTION OF THE DRAWINGS

FIG. 8 shows a waveform, which represents the electrical signal output from a microphone in the vehicle passenger compartment depicted in FIG. 7, responsive to a speech signal from a driver;

FIG. 9 depicts a delayed copy of the waveform shown in FIG. 8;

FIG. 10 shows a waveform, which represents the electrical signal output from a microphone shown in FIG. 7, responsive to a speech signal sound wave from a passenger; and FIG. 11 is a delayed and inverted copy of the waveform shown in FIG. 10.

DETAILED DESCRIPTION

Constructive and destructive interference of traveling waves, demonstrated by Young's experiment, is well known. Put simply, when a light wave passes through two slits that are cut through a plate, the light waves emanating from the slits will produce alternating bright and dark bands on a screen located beyond the plate. The alternating bands produced on the screen are caused by additive and destructive interference of the waves that emanate from the slits.

Additive and destructive interference of transmitted radio waves is also well known. One use of the phenomena is phased-array radar. Put simply, phased-array radar directs an RF signal transmitted from two closely-spaced antennas, and hence directs a radar "beam" by changing the phase of the RF signal sent to one antenna, relative to the signal sent to a second antenna.

Another use of additive and destructive interference of traveling waves is directionally-selective or "beam forming" microphones, which are also well known. See for example, McCowan et al., "Near-field Adaptive Beam former for Robust Speech Recognition," Queensland University of Technology, Brisbane, Australia, the entire content of which is incorporated herein by reference. As described hereinafter, multiple pairs of super-directional microphones, each of which is effectuated by digitally delaying signals from two different microphones by progressively different lengths of time, accurately locate and detect sounds from a driver and a co-talking passenger. Sound from a co-talking passenger, picked up by at least one super-directional microphone pair having the strongest co-talking passenger audio, is removed from the sound of the driver, picked up by the super-directional microphone pair having the strongest driver audio signal.

Figure 1:
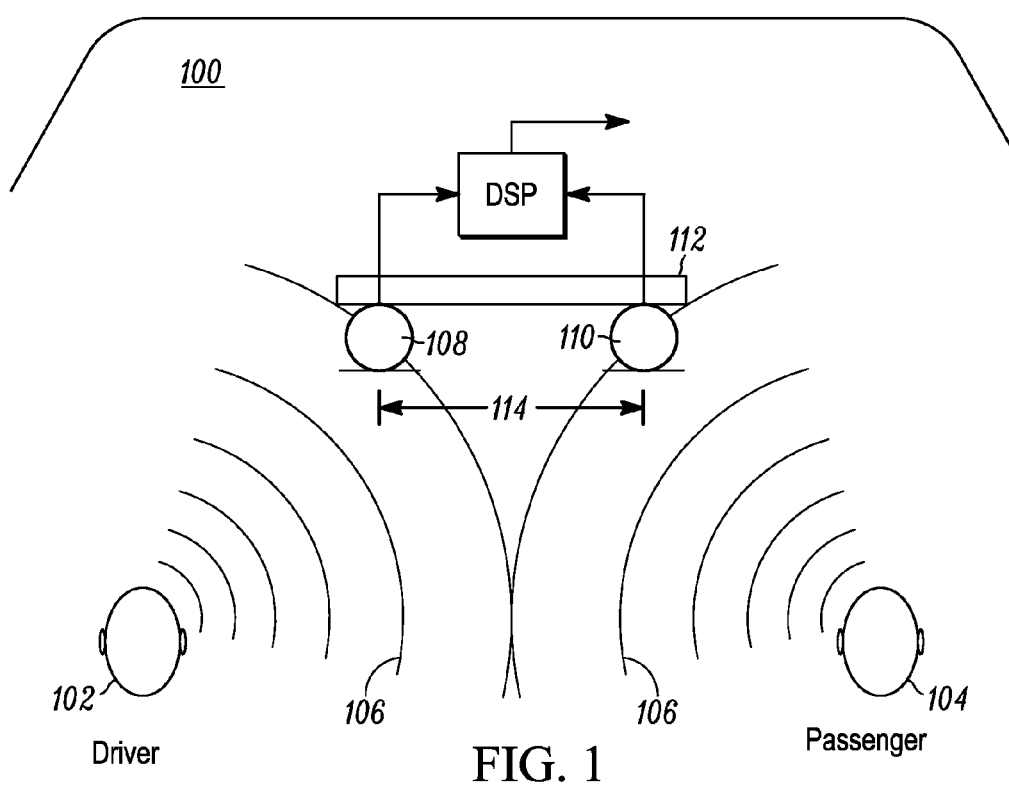
FIG. 1 is a schematic depiction of a plan view of a vehicle passenger compartment.

Referring now to the figures, FIG. 1 is a schematic depiction of a plan view of a vehicle passenger compartment 100, a vehicle driver 102, a vehicle passenger 104 and sound waves emitted from each of them, the sound waves being represented by concentric circle portions 106. FIG. 1 also shows the placement of two, non-directional and general-purpose microphones 108, 110 relative to the driver 102 and passenger 104. In FIG. 1, the microphones 106, 108 are shown attached to the vehicle's rear-view mirror 112 and are thus spaced apart from each other by a relatively small distance 114, typically 10-14 inches.

As FIG. 1 shows, the right-hand microphone 108 is farther from the driver 102 than the left-hand microphone 108. Similarly, the left-hand microphone 108 is farther from the passenger 104 than is the right-hand microphone 110. A sound wave 106 emitted from the driver 102 will thus reach the left-hand microphone 108 before the same sound wave 108 from the driver 102 reaches the right-hand microphone 110. A sound wave 106 emitted from the passenger 104 on the other hand will thus reach the right-hand microphone 110 before the same sound wave 104 from the passenger 104 reaches the left-hand microphone 108.

When the driver 102 speaks, the corresponding sound wave 106 from the driver 102 reaches the two microphones 108, 110, at two different times. Sound from the driver will reach the left microphone 108 before the sound reaches the right microphone 110. The analog, electrical signal generated by the right-hand microphone when it transduces the sound wave from the driver will have a phase angle that "lags" or is behind the phase angle of the electrical signal generated by the left-hand microphone when it transduces the same sound wave. When the passenger 104 speaks, and the corresponding sound wave 106 from the passenger 104 reaches the two microphones 108, 110, the analog, electrical signal generated by the left-hand microphone when it transduces the sound wave from the passenger will have a phase angle that "lags" or is behind the phase angle of the electrical signal generated by the right-hand microphone when it transduces the same passenger sound wave.

Audio signals from the two microphones are sampled and converted to a digital value representative of the sample using techniques well known to those of ordinary skill in the signal processing art. In order to produce a super-directional microphone "beam," i.e., a microphone that is directionally selective, it is necessary to effectuate an equivalent to the additive and constructive interference of waves that originate from different locations in space and which would have to travel different distances to the two microphones. An equivalent to spatially locating the microphones at different locations in order to accomplish an addition of waves coming from a particular direction, the digital value representing a sample from a first microphone is selectively delayed, digitally, by a predetermined length of time and then combined with a sample obtained from the other microphone. When a digital value representative of an un-delayed sample is added to a digital value representative of a previously-obtained and delayed sample, the resultant value will be either an additive or destructive interference of the audio signals detected by the microphones. Stated another way, by selectively delaying and combining samples from different microphones, the signals provided by the two microphones are combined with an additive or destructive "interference" of audio signals from which the samples were obtained. Selectively delaying and combining delayed samples obtained from the microphones thus enables the two microphones to selectively receive audio from different locations. The microphones thus behave as if they receive and transduce audio from only a region or area located at a distance from both microphones such that the signals received at the microphones will additively combine. Audio signals that originate from locations in the vehicle such that when they are combined they destructively interfere with each other can thereby be selectively received or suppressed by additively or destructively combining samples together.

Signals from the two microphones 108, 110 can thus be manipulated, digitally, in order to effectuate a spatial selectivity or "beam" from which sounds detected by both microphones will be additively or coherently combined with each other and thus available for subsequent use or processing.

Figure 2:
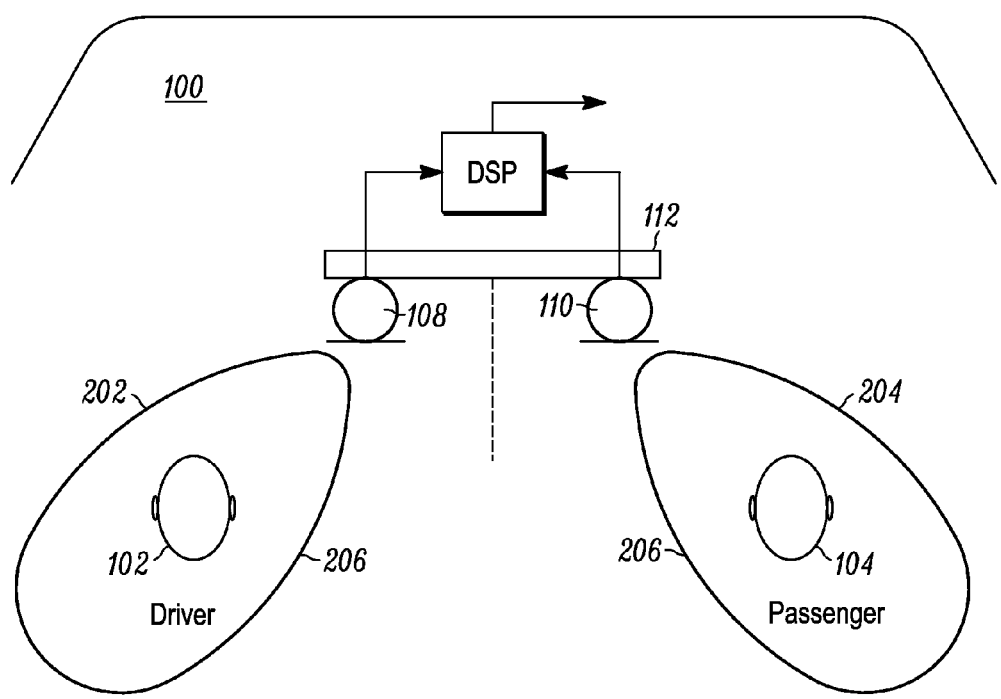
FIG. 2 is a schematic representation of a pair of spatially-selective microphone detection beams.

FIG. 2 is a schematic representation of a pair of spatially-selective microphone detection "beams" 202, 204, which are also referred to herein as a "beam pair" 206. The "beams" 202, 204 are "generated" by constructive and destructive interference of sound waves described above. A left-side microphone area of sensitivity or "beam" 202 is "directed" toward where the driver 102 is located in a passenger compartment 100 and selectively detects sounds emitted from the driver. A right-side microphone "beam" 204 is "directed" toward where the passenger 104 is located, selectively detects sounds emitted from the passenger 104.

Those of ordinary skill in the signal processing art will recognize that some sound from the driver 102 will reach and be detected by the microphone 110 closest to the passenger 104. Similarly, sound from a passenger 104 will also reach and be detected by the microphone 108 closest to the driver 102. It is therefore important to locate the driver and co-talking passenger as close as possible in order to be able to suppress detected co-talker sound from detected driver sound. Once the co-talking passenger is located, the co-talker's speech, picked up by a microphone beam, can be suppressed.

Figure 3:
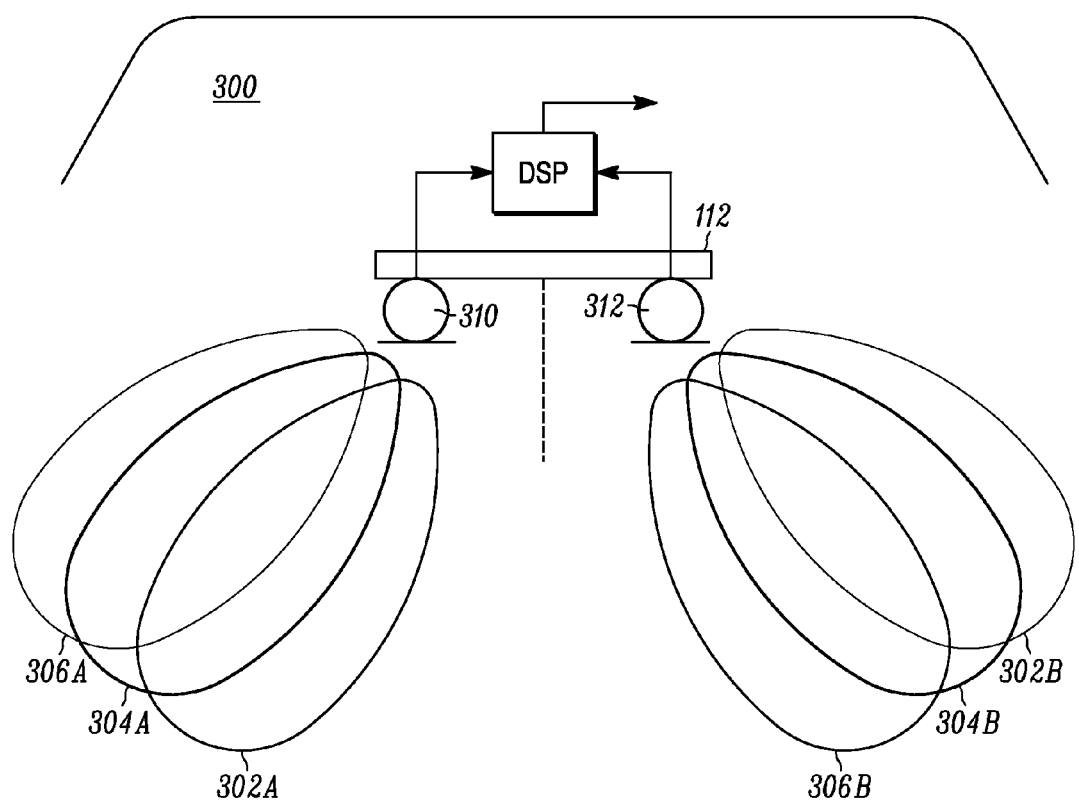
FIG. 3 depicts pairs of directional lobes, representing spatially-selective virtual microphones.

FIG. 3 depicts pairs of directional lobes, the pairs being identified by reference numerals 302A and 302B, 304A and 304B, and 306A and 306B. The lobes represent generally, the spatial areas of the passenger compartment 100 where sounds will be selectively detected using two physical microphones 310, 312, the output sounds of which are processed digitally to effectuate a plurality of directionally-selective virtual microphones using the principles of additive and destructive interference of traveling audio waves.

Different selective directions of the beam pairs are accomplished by detecting a sound picked up by a first virtual microphone and picked up by a second virtual microphone. Sound from one of the virtual microphones is selectively delayed by progressively different lengths of time. Each delayed sample is then combined with a sample of a sound contemporaneously detected by the other microphone. Since the microphones are located away from a sound source by slightly different distances, a sound picked up by one microphone will have a different phase angle than the same sound picked up by a different microphone. When the difference between those phase angles is 180 degrees, adding the sounds together will cause the sounds picked up by the microphones to cancel. By changing the lengths of the delay time of sound from one microphone and combining the differently-delayed sounds together, combining the differently-delayed samples to an un-delayed sample will produce different degrees of either additive or destructive interference. Such interference occurs as if the detected sounds originated at different spatial locations, which is equivalent to "steering" the directions from which the audio is detected. A beam pair 302, 304, 306 that produces the largest-amplitude constructive interference of signals from the driver and passenger respectively, determines both the driver and passenger locations more accurately than is possible using a single beam but also their respective speech signals more accurately than is possible using a single beam. A decision whether a sound is from a passenger or driver is made based on whether the amplitudes of sounds detected by microphones are above or below predetermined thresholds, as set forth below.

In an alternate embodiment, the electrical signals emitted from spatially-separated microphones can be selectively "gated" or sampled, in order to selectively receive and ignore sound waves that arrive at the two microphones at different times. By way of example, electrical signals from the microphone 108 can be sampled at the first instant of time, t1, and thereafter ignored. At a later time, t2, electrical signals from the other microphone 110 can be sampled and thereafter ignored. By choosing t1 and t2 such that the difference between them is equal to the time required for a wavelength of a sound to propagate from the first microphone to the second microphone, the two samples will add constructively. Conversely, if t1 and t2 are selected such that their difference is the time required for a half-wavelength of a sound to propagate from the first microphone to the second microphone, the two samples will add destructively. Selectively choosing t1 and t2 thus enables the two, spatially separated microphones to directionally discriminate sounds by sampling sounds from the microphones at different times.

By comparing the relative amplitudes of sounds that are selectively detected by each beam pair and comparing those amplitudes to experimentally-determined and predetermined thresholds, the beam pairs comprise a directionally-selective filter by which a location of a driver and driver's audio can be located more accurately than is possible without using multiple beam pairs. Audio signals from the beam pairs 302, 304, 306 are thus able to locate a driver and passenger. Beam pairs that provide the strongest detected signals, as compared to threshold values, are thereafter used to selectively remove passenger audio signals from driver audio signals. Stated another way, the beam pairs enable a selective location of a driver's speech and a passenger's speech by comparing outputs generated from each beam pair. The multiple beam pairs also enable the suppression of speech signals originating from a passenger.

Figure 4:
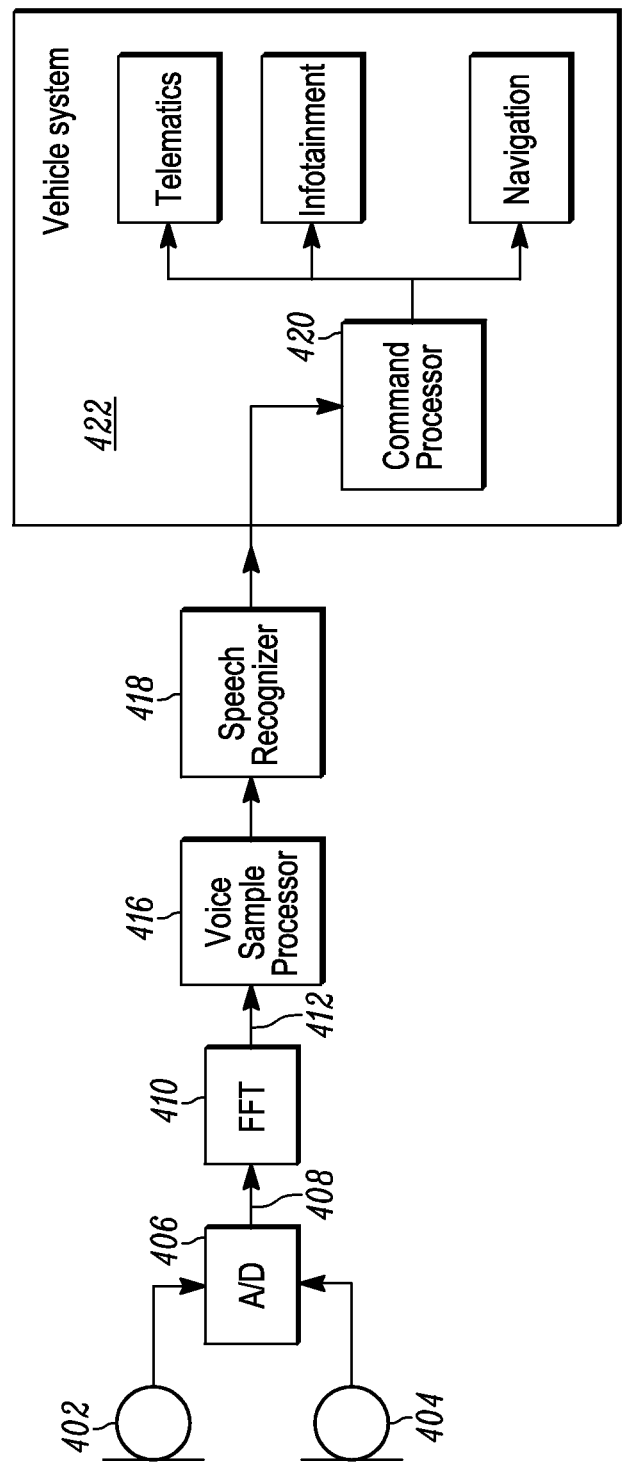
FIG. 4 is a block diagram of an audio system.

FIG. 4 is a block diagram of an audio system 400 controlled by speech. The system 400 comprises two, conventional but spatially separated microphones 402, 404, a conventional analog-to-digital (A/D) converter 406, a Fast Fourier Transform processor 410, which is configured to generate Fourier transforms 408 of digital signals output from the A/D/converter 406, a voice sample processor 416, a speech recognizer 418 and a command processor 420. The command processor 420 forms part of a separate vehicle system 422, such as a voice-actuated navigation or "infotainment" device or system.

In a preferred embodiment, the vehicle system 422 is controllable by voice commands that are first recognized as being from a driver by the voice sample processor 416. Commands recognized as being from a driver are thereafter provided to a speech recognizer, which is configured to process sounds and recognize phonemes and generate electrical signals, configured to effectuate an operation of a vehicle system, such as a command to a radio, cell phone, or navigation system. In a preferred embodiment, the voice sample processor 416 and speech recognizer 418 are embodied in the same digital signal processor (DSP).

Figure 5:
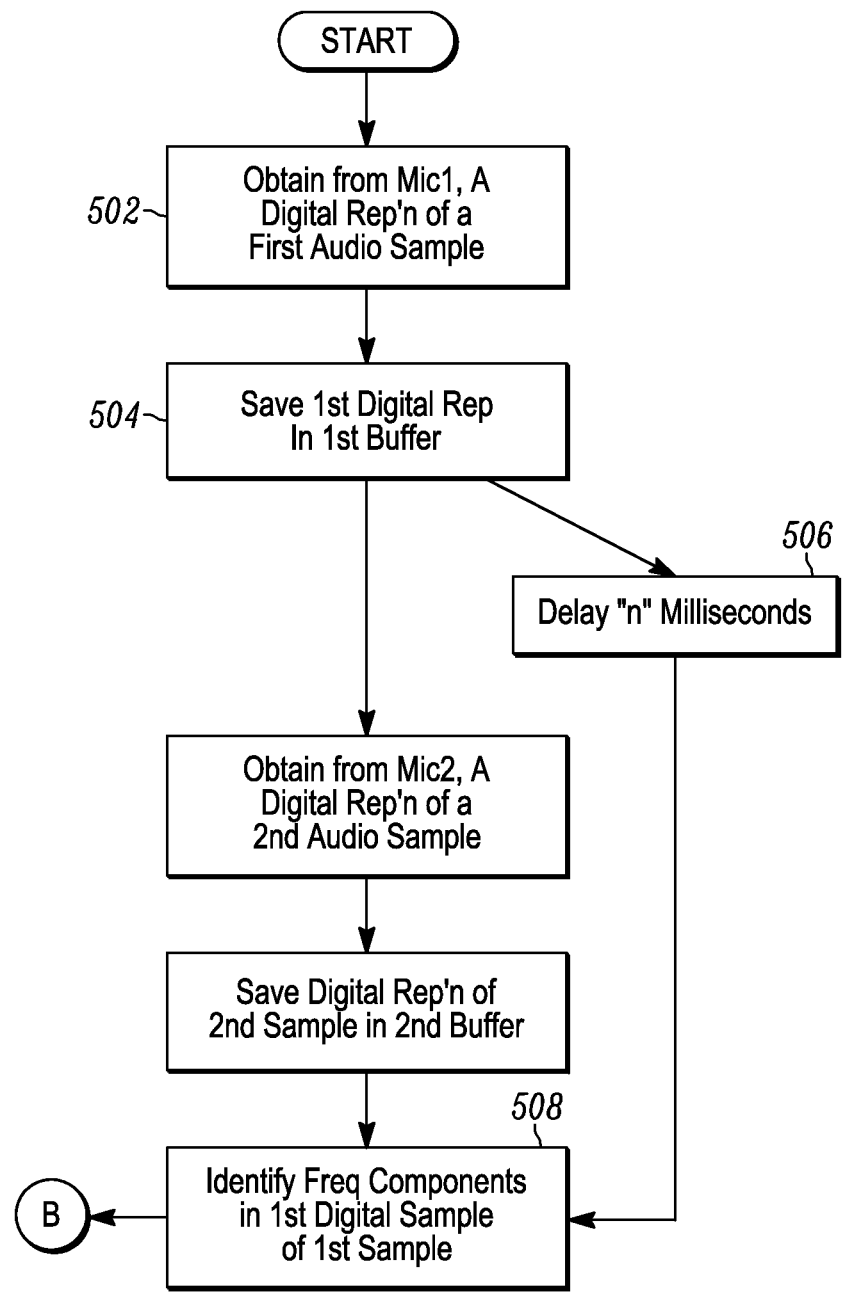
FIG. 5 depicts steps of a method performed by a voice sample processor on a single "beam" pair and which enables a selective capture or audio from a driver.
Figure 5:
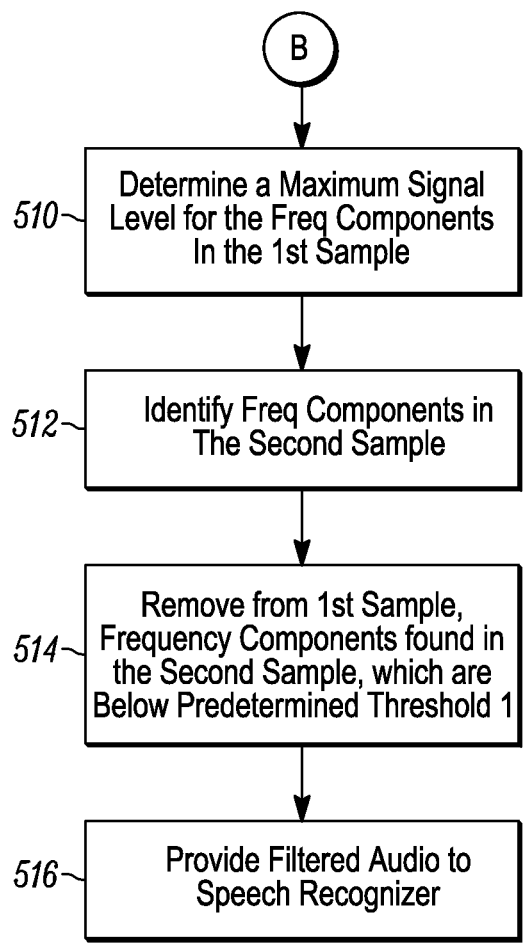

As noted above, beam forming and microphone beam forming is well-known, the beam forming of multiple beams, however, and the selective detection and suppression of sounds from a driver and passenger respectively is not heretofore known. FIG. 5 depicts steps of a method performed by the voice sample processor on a single "beam" pair and which enables a selective capture of audio from a driver and simultaneously reduces or suppresses audio signals from a passenger using multiple super-directional pairs of microphone "beam pairs," such as the ones depicted in FIG. 3. The steps shown in FIG. 5 are thus performed on a beam-pair by beam-pair basis.

Steps presented in FIG. 5 are not in a particular order in which the steps must be performed. By way of example, the frequency components of a FFT representation of a voice sample from a first microphone can be determined any time prior to when the frequency components of one sample needs to be removed or subtracted from a FFT representation of a second sample from a second microphone.

In a first step 502, which is shown in FIG. 5A, a Fast Fourier Transform (FFT) representation of a sample of a signal transduced by a first one of the two microphones is generated. The sample is stored in a register or memory device at step 504 in order to be able to control the time that the digital representation of the microphone sample will be combined with a sample from another microphone.

Step 506 shows that a predetermined amount of time is allowed to pass. After the predetermined amount of time has passed, the frequency components of the FFT are determined at step 508. As noted above, the determination of FFT components could also be made prior to the FFT being stored.

At step 510, which is shown in FIG. 5B, a maximum signal level is determined for each of the frequency components in the FFT of the first sample. Stated another way, a maximum amplitude of the sounds picked up by the microphone closest to the driver is determined.

At step 512, frequency components of the second sample are determined. Which is to say, the frequency components of audio picked up by the microphone closest to the passenger, are determined.

At step 514, components of the frequencies picked up by the microphone closest to the passenger are removed from the frequency components of the audio picked up by the microphone closest to the driver. The resultant difference is a nulling of the components of the signals picked up by the microphone closest to the passenger from the signals picked up by the microphone closest to the passenger.

It is important that the signals picked up by the microphone closest to the passenger and the signals picked up by the microphone closest to the driver are signals picked up by a directionally discriminating virtual microphone, referred to herein as a microphone "beam." Stated another way, the signals picked up by each microphone are the audio signals that are selected directionally by a coherent or constructive interference of waves picked up by the two microphones. Moreover, multiple microphone "beams" are used in each direction, i.e., multiple "beams" are directed toward the driver and multiple "beams" are directed toward the passenger. Audio signals picked up from the multiple beams directed toward the passenger, one beam of which will have a maximum detected signal level, are suppressed from the audio signals picked up by the multiple beams directed toward the driver, one beam of which will also have a maximum detected signal level. The multiple, directionally-selective microphone beam pairs are provided by selectively delaying samples from one of the two microphones by different lengths of time.

Despite the directional selectivity that can be achieved by receiving audio samples at different selected times at a first microphone and combining those samples with samples from a second microphone, it is not possible to completely avoid detecting sound that originates from locations outside of a directional beam. Stated another way, both microphones will detect at least some audio from both a driver and a passenger. Detecting speech preferentially from a first person while a second person is also speaking requires identifying speech coming from the second person. Suppressing or nulling a co-talker's speech, i.e., co-talker nulling (CT) comprises essentially three steps, one of which is optional.

The first step is to identify the spatial location of any speech, which is accomplished using the methodology and apparatus described above. A second step is to attenuate speech determined to be coming from a location other than the driver's, i.e., remove or suppress from the driver's detected speech, signals that come from sources other than the driver. In a third and optional step comfort noise is injected for any speech that is attenuated.

In a preferred embodiment, the operation of which is represented by the equations below, $wv_{D,k}(f)$ and $wv_{P,k}(f)$ are the kth virtual microphone beam forming microphone weight vectors. They represent directionally-selective beams from beam forming microphones that "look" at the driver and front-seat passenger respectively. The outputs from these two weight vectors are calculated as:

$$ZF_{D,k}(f) = wv_{D,k}^{H}(f) ZF(f)$$

$$ZF_{P,k}(f) = wv_{P,k}^{H}(f) ZF(f)$$

where H denotes Hermitian transpose.

A quantity $\zeta$ is used to determine the source of a signal from among four possibilities: 1. Driver, 2. Passenger, 3. Concurrent (Driver+Passenger speech overlapping in time), and 4. Speech Absence. The frequency range over which $\zeta$ is calculated is chosen such that a beam pair $wv_{D,k}(f)$ and $wv_{P,k}(f)$ exhibits a large contrast/discrimination in directionality. The quantity $\zeta$ is calculated from $ZF_d(f)$ and $ZF_p(f)$ as follows $$\zeta_k = \frac{\sum_{f=N1}^{N2} \|ZF_{D,k}(f)\|^2}{\sum_{f=N1}^{N2} \|ZF_{P,k}(f)\|^2}$$

Maximum and minimum values for $\zeta$ are calculated as:

$$\zeta_{max} = \max_k(\zeta_k)$$

$$\zeta_{min} = \max_k(\zeta_k)$$

A frequency range is from a first "bin," N1, to a second "bin," N2. The values for N1 and N2 are determined from knowledge of the microphone array geometry.

Implied in these computations is a pairing between driver-side microphone pairing, i.e., a pairing of the microphone beam "lobes" on the passenger-side with microphone beam "lobes" on the passenger side. The microphone pairings are defined by the symmetry of the microphone array. For example, for virtual microphone index k=0, the driver-side virtual microphone is the left-most beam and the passenger-side beam is the right-most beam, i.e., the paired virtual microphones are mirror images about broadside. By defining two thresholds $D_{threshold}$ and $P_{threshold}$, the location of a source of speech, vSource, is determined according to the steps set forth in the following pseudo code:

```
       if (VAD = 0)
       {
           vSource = SpeechAbsent;
       }
       else
       {
           if (ζmin > Dthreshold)
               vSource = Driver ;
           else if (ζmax < Pthreshold)
               vSource = Passenger ;
           else
               vSource = Concurrent ; // Speech from driver and passenger
       overlapping in time }
```

Where VAD is a voice activity detector, well known to those of ordinary skill in the art.

Put simply, when a driver's voice activity detector, VAD, is true, speech has been detected. Detected speech is considered to be speech from the driver if the minimum amplitude of the detected speech, $\zeta_{min}$, is greater than a first, experimentally-determined minimum threshold value for the driver's detected speech, i.e., $D_{threshold}$. If the maximum amplitude of the detected speech is less than a second, experimentally-determined maximum threshold for the passenger's detected speech, i.e., $P_{threshold}$. If the maximum amplitude of detected speech is greater than $P_{threshold}$ and less than $D_{threshold}$, the detected speech is considered to be coming from both the passenger and the driver.

Figure 6:
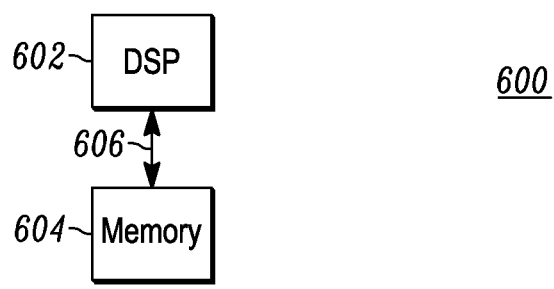
FIG. 6 is a block diagram of a voice sample processor.

FIG. 6 is a block diagram of an apparatus 600, which provides the functionality of a voice sample processor depicted in FIG. 4, at least some functionality of which is described above and depicted in FIG. 5. Put simply, the apparatus is preferably embodied as a digital signal processor 602, one or more non-transitory memory devices 604 and predetermined instructions stored in the memory device and therefore not shown in FIG. 6. When the instructions in the memory device 604 are executed, they cause the DSP to perform the method steps described above, including the method steps shown in FIG. 5. The memory 604 is coupled to the DSP 602 by a conventional bus 606.

The apparatus and methodology described above is effective to detect speech from a driver and null speech from a co-talking passenger, as long as the microphones that are operated to provide directionally-discriminating microphone beams are relatively close to each other, a preferred spacing between about ten to fourteen inches separation between them. When the separation distance between the microphones is significantly greater, e.g., about 30 inches or more, selectively delaying voice samples to provide beam-forming microphones is problematic. When the microphone spacing is about 30 inches or more, a different apparatus and method is used to detect speech from a driver and null speech from a co-talking passenger.

In an alternate embodiment wherein microphones are spaced relatively far apart from each other, i.e., about 30 inches, two "beam forming" microphones are arranged so that acoustic energy emanating from the direction of a desired speaker has a zero-degree phase between the two beams; acoustic energy emanating from the direction of a co-talker has a 180-degree relative phase. A phase estimation of the two beams is used as talker discriminator. A phase estimation of the two beams is also usable as a co-talker nulling mechanism.

Figure 7:
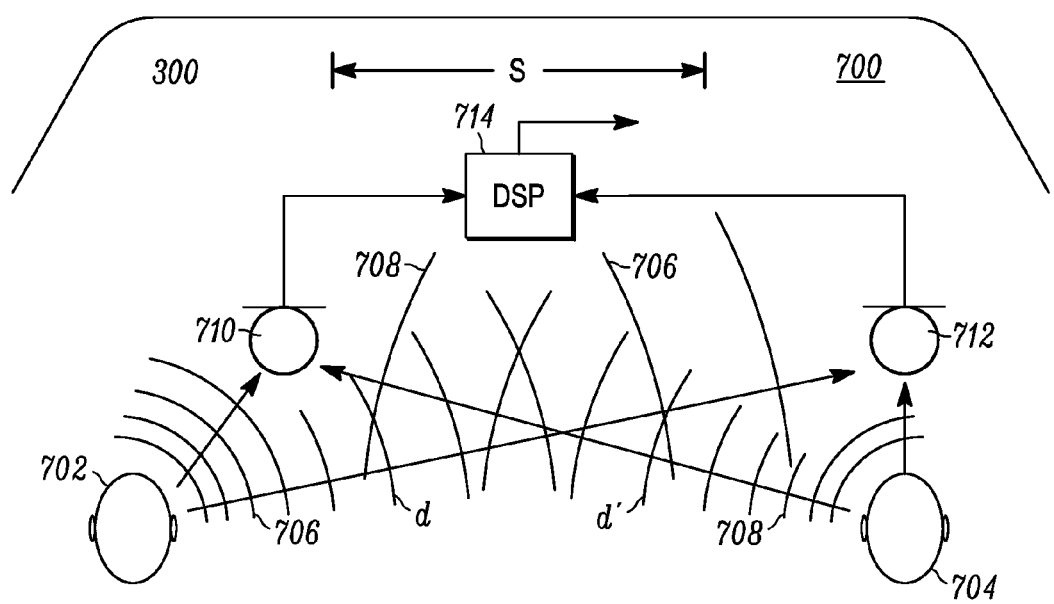
FIG. 7 is a schematic depiction of a plan view of a vehicle passenger compartment.

FIG. 7 is a schematic depiction of a plan view of a vehicle passenger compartment 700, a vehicle driver 702, a vehicle passenger 704 and sound waves emitted from each of them, the sound waves being represented by concentric circle portions 706 and 708 respectively. FIG. 7 also shows the placement of two, non-directional and general-purpose microphones 710, 712 relative to the driver 702 and passenger 704. In FIG. 7, the microphones 710, 712 are both coupled to the same digital signal processor (DSP) and separated from each by a separation distance, S, which is about 30 inches. The two microphones and the DSP are configured such that two, directionally-selective microphones are able to pick up sound from the driver and passenger.

FIG. 8 shows a first waveform 800-1, which represents the electrical signal output from the first microphone 710 responsive to a speech signal sound wave 706 emitted from a driver 102 and that impinges upon the first microphone 710. A second waveform 800-2, which is identical to the first waveform 800-1 but slightly delayed, represents the electrical signal output from the second microphone 712 responsive to the same speech signal sound wave 706 emitted from a driver 102 but which impinges upon the second microphone 712. The second waveform 800-2 is therefore generated slightly "behind" the first waveform 800-1 by a short period of time. The second waveform 800-2 and the first waveform 800-1 thus differ only in time, the difference between the two waveforms being measured by a phase angle difference denominated as, "φ."

When the first waveform 800-1 generated by the first microphone 710 is delayed by a very short period of time that is equal to the time difference corresponding to φ, the delayed waveform 800-1 and the second waveform 800-2 will then be in phase with each other. When the two in-phase waveforms are added together, they will constructively add to each other as shown in FIG. 9, which depicts the delayed first waveform 800-1 constructively added to the second waveform 800-2 to form a third waveform 900.

In a preferred embodiment, a digital signal processor (DSP) 714 shown in FIG. 7 is programmed to receive samples of the audio signals output from the two microphones 710, 712. The DSP is programmed to convert time-domain samples that originate from the microphones, to the frequency domain by performing a Fast Fourier Transform. After the samples obtained from the microphones in the time domain are converted to the frequency domain, individual frequencies or ranges of frequencies representing the audio signals output from a first microphone are selectively delayed by differing lengths of time then combined with corresponding frequency domain representations of samples obtained from the second microphone such that the audio signals represented by the time-delayed samples from the first microphone are in-phase with audio signals represented by samples obtained from the second microphone. Stated another way, the speech obtained from one of the microphones is time-delayed, preferably in the frequency domain, by an amount of time such that when the time-delayed speech is combined with speech obtained from the other microphone, the combined speech signals will add coherently, as shown in FIG. 9.

Referring now to FIG. 10, a first waveform 1000, which represents the electrical signal output from the second microphone 712 responsive to a speech signal sound wave 708 emitted from a passenger 104 and that impinges upon second microphone 712. FIG. 11, depicts a second waveform 1100, which represents the signal output from the first microphone 710 responsive to the same speech signal sound wave 708 emitted from a passenger 104 but which impinges upon first microphone 710 a short time after the sound wave 708 reaches the second microphone 712. As can be seen in FIGS. 10 and 11, the two waveforms 1000 and 1100 are one-hundred eighty degrees out of phase with each other. The two waveforms, i.e., the waveform captured at the second microphone 712 that is out-of-phase with the waveform captured at the first microphone 710, will cancel each other when they are added. By delaying a sample of the first waveform 1000 obtained at the second microphone 712 by an amount of time equal to the time required for a half-wave length of the sound wave 108 to travel the additional distance, d', to the first microphone 710, the out-of-phase samples will destructively interfere with each other, effectively cancelling speech from the passenger.

Those of ordinary skill in the art will recognize that processing speech signals as shown in FIGS. 7-11 can be accomplished using the DSP shown in FIG. 6 and executable instructions stored in an associated non-volatile memory device also shown in FIG. 6. By selectively enabling or configuring two microphones 710, 712 and their associated DSP 714 to capture and delay sound that is captured at at least one microphone by the time required for either a full wave or half-wavelength to travel to the second microphone, the outputs of the microphones 710, 712, or digital representations thereof, can be made to add or cancel each other on a frequency-by-frequency basis.

The foregoing description is for purposes of illustration. The true scope of the invention is set forth in the following claims.

The invention claimed is:

1. In a vehicle having a driver and a passenger and first and second microphones, both microphones being capable of detecting sounds from both the passenger and driver, a method for selectively detecting sounds from the driver and suppressing sounds from the passenger, the method comprising:
   selectively detecting at the first microphone, a first sample of a sound from the driver, the first sample of the sound from the driver comprising a first frequency component, the first sample of the sound from the driver being a sample of the first frequency component at a first phase angle;
   selectively detecting at the second microphone, which is spatially separated from the first microphone by a distance of at least twelve inches, a second sample of the sound from the driver, the second sample of the sound from the driver also comprising the first frequency component, said second sample being a sample of the first frequency component having a second and different phase angle;
   storing the first sample of the sound from the driver for a first predetermined length of time to provide a delayed first sample of the sound from the driver, the first predetermined length of time selected such that the phase angles of the delayed first sample of the sound from the driver and of the second sample of the sound from the driver are made to be substantially equal to each other;
   combining the delayed first sample and the second sample of the sound from the driver to provide a first constructive interference;
   selectively detecting at the first microphone, a first sample of a sound from the passenger, the first sample of the sound from the passenger comprising a second frequency component, the first sample of the sound from the passenger being a sample of the second frequency component at a third phase angle;
   selectively detecting at the second microphone, a second sample of the sound from the passenger, the second sample of the sound from the passenger comprising the second frequency component, the second sample being a sample of the second frequency component at a fourth phase angle;
   storing the first sample of the sound from the passenger for a second predetermined length of time to provide a delayed first sample of the sound from the passenger, the second predetermined length of time being selected such that the phase angle of the delayed first sample of the sound from the passenger and the fourth phase angle are substantially equal to each other;
   combining the delayed first sample and the second sample of the sound from the passenger to provide a second constructive interference, the second predetermined length of time being additionally selected to determine a direction from which sound from the passenger will be directionally detected by said first and second microphones;
   determining the location of the driver in the vehicle as corresponding to where a first directionally selective microphone beam is directed and whereat the amplitude of the constructive interference of the first and second sound samples from the driver is greatest;
   determining the location of the passenger in the vehicle as corresponding to the direction of a second directionally selective microphone beam directed at the passenger, whereat the amplitude of the constructive interference of the first and second sound samples from the passenger is greatest; and
   filtering sounds to be provided to a speech recognizer by selectively detecting the sounds of the driver and suppressing the sounds from the passenger, by subtracting the second constructive interference as per the determined location of the passenger, from the first constructive interference as per the determined location of the driver.

2. The method of claim 1, wherein the second predetermined length of time is substantially equal to an integer multiple of the length of time required for one wavelength of the first frequency component to travel between the first microphone and second microphone.

3. The method of claim 1, wherein selectively detecting samples of sounds at the first and second microphones directionally selects sounds from at least one of the driver and passenger.

4. An apparatus for a vehicle having a driver and a passenger and first and second microphones, both microphones being capable of detecting sounds from both the passenger and driver, the apparatus configured to selectively detect sounds from the driver and suppress sounds from the passenger, the apparatus comprising:

a digital signal processor coupled to the first and second microphones;

a non-transitory memory device coupled to the digital signal processor and storing program instructions, which when executed cause the digital signal processor to:

selectively detecting at a first microphone, a first sample of a sound from the driver, the first sample of the sound from the driver being a sample of a first frequency component at a first phase angle;

selectively detecting at a second microphone, which is spatially separated from the first microphone by a distance of at least twelve inches, a second sample of the sound from the driver, said second sample being a sample of the first frequency component at a second phase angle;

storing the first sample for a first predetermined length of time to provide a delayed first sample of sound from the driver, the first predetermined length of time selected such that the phase angles of the delayed first sample of sound from the driver and the second phase angle are substantially equal to each other; and combining the delayed first sample and the second sample of sound from the driver to provide a first constructive interference;

selectively detecting at the first microphone, a first sample of a sound from the passenger, the first sample of the sound from the passenger being a sample of a third frequency component at a third phase angle;

selectively detecting at the second microphone, a second sample of the sound from the passenger, said second sample being a sample of the third frequency component at a fourth phase angle;

storing the first sample of sound from the passenger for a predetermined second length of time to provide a delayed first sample of sound from the passenger, the predetermined second length of time being selected such that the phase angle of the delayed first sample of sound from the passenger and the fourth phase angle are substantially equal to each other; and combining the delayed first sample and the second sample of the sound from the passenger to provide a second constructive interference, the second predetermined length of time being additionally selected to determine a direction from which sound from the passenger will be directionally detected by said first and second microphones;

determining the location of the driver in the vehicle as corresponding to where a first directionally selective microphone beam is directed and whereat the amplitude of the constructive interference of the first and second sound samples from the driver is greatest;

determining the location of the passenger in the vehicle as corresponding to the direction of a second directionally selective microphone beam directed at the passenger, whereat the amplitude of the constructive interference of the first and second sound samples from the passenger is greatest; and filtering sounds to be provided to a speech recognizer by selectively detecting the sounds of the driver and suppressing the sounds from the passenger, by subtracting the second constructive interference as per the determined location of the passenger, from the first constructive interference as per the determined location of the driver.

5. The apparatus of claim 4, wherein the digital signal processor is configured such that the first and second predetermined lengths of time are substantially equal to an integer multiple of the length of time required for one wavelength of the first frequency component to travel between the first microphone and second microphone.

6. The apparatus of claim 4, wherein the digital signal processor is configured such that selectively detecting samples of sounds at the first and second microphones directionally selects sounds from at least one of the driver and passenger.

* * * * *